(12) United States Patent
Phillips et al.

(10) Patent No.: US 7,291,048 B1
(45) Date of Patent: Nov. 6, 2007

(54) ACTUATOR DEVICE FOR A MARINE PROPULSION TRANSMISSION

(75) Inventors: George E. Phillips, Oshkosh, WI (US); John M. Griffiths, Fond du Lac, WI (US); Wayne M. Jaszewski, Jackson, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 11/786,821

(22) Filed: Apr. 13, 2007

(51) Int. Cl.
*B63H 20/20* (2006.01)

(52) U.S. Cl. .............................. 440/75; 192/21; 192/51

(58) Field of Classification Search .................. 440/75, 440/86; 192/21, 51
See application file for complete search history.

(56) References Cited

U.S. PATENT DOCUMENTS

| | | | |
|---|---|---|---|
| 2,756,855 A * | 7/1956 | Kloss ....................... 192/41 S |
| 3,858,101 A | 12/1974 | Schmiedel et al. |
| 3,919,964 A * | 11/1975 | Hagen .......................... 440/75 |
| 4,668,198 A | 5/1987 | Nakamura |
| 4,698,035 A | 10/1987 | Ferguson |
| 4,986,774 A | 1/1991 | Wantz |
| 5,151,059 A * | 9/1992 | Higby .......................... 440/75 |
| 5,470,264 A | 11/1995 | Eick |
| 6,176,750 B1 | 1/2001 | Alexander et al. |
| 6,692,320 B1 | 2/2004 | Sawyer |
| 6,755,703 B1 | 6/2004 | Erickson |

* cited by examiner

*Primary Examiner*—Sherman Basinger
(74) *Attorney, Agent, or Firm*—William D. Lanyi

(57) ABSTRACT

An actuator of a marine propulsion transmission is attached to a movable clutch member through the use of a coupler which comprises a generally spherical member formed as a portion of the actuator and a chuck device formed as part of the clutch member. The generally spherical member, or alternatively shaped component, is received by the chuck device and retained therein. The components are configured to allow relative rotation between the actuator and the clutch member while causing them to move axially in synchrony with each other.

18 Claims, 5 Drawing Sheets

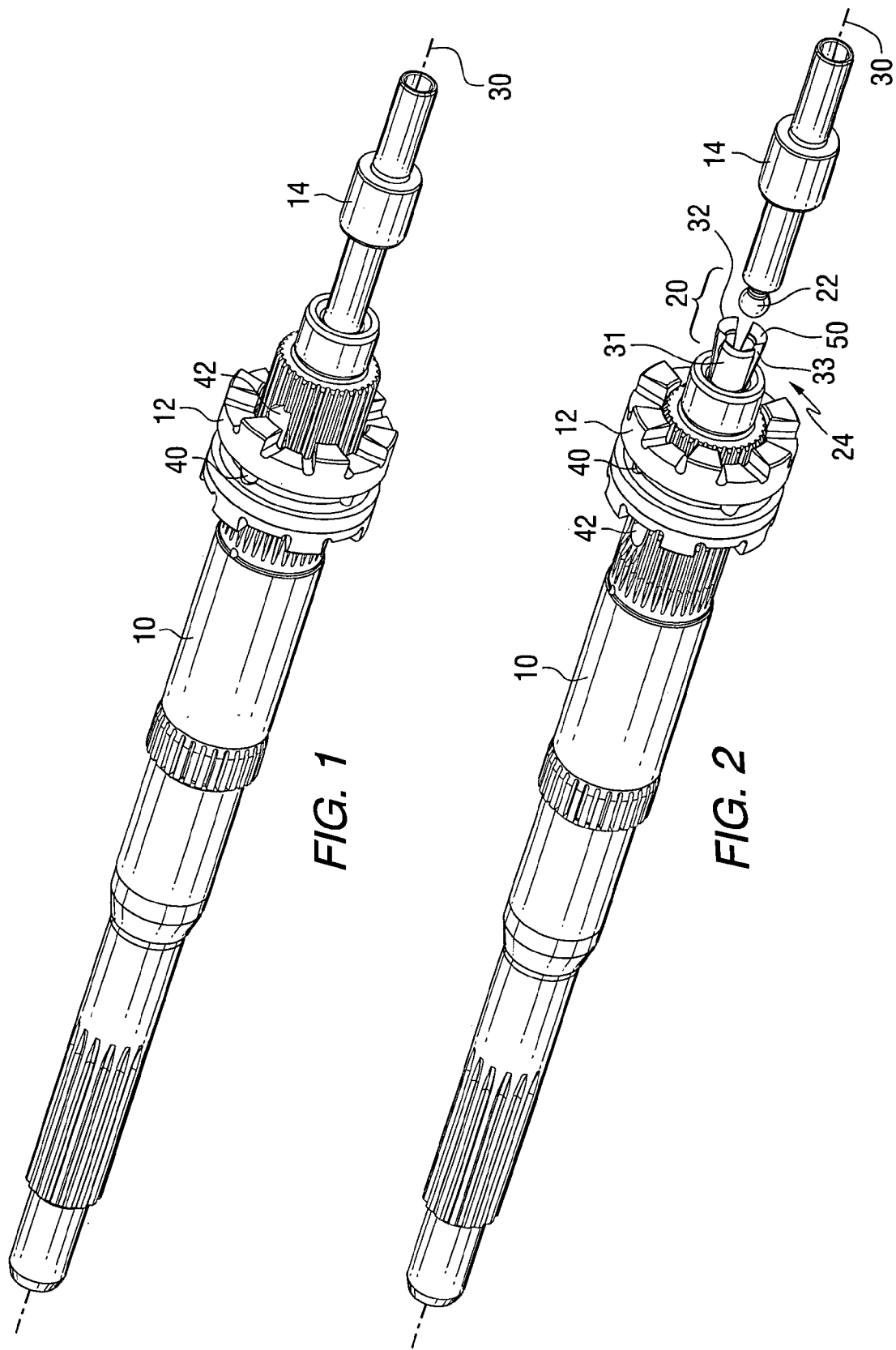

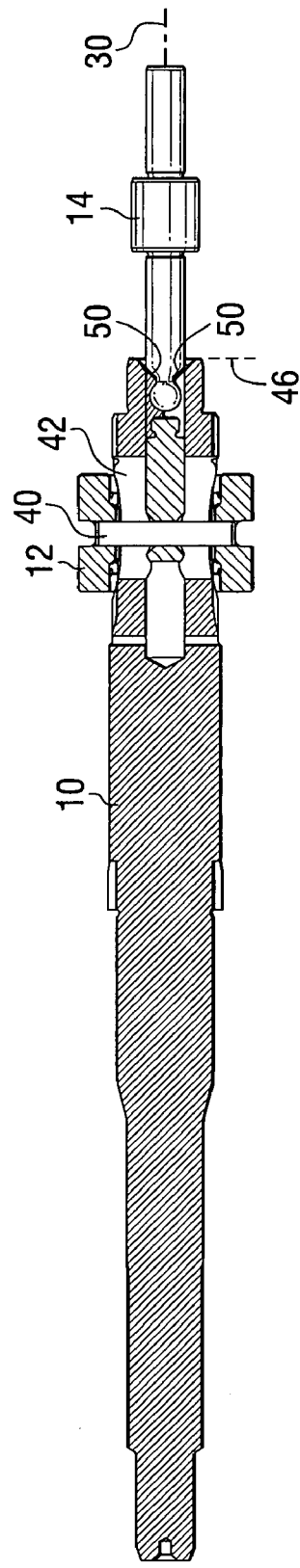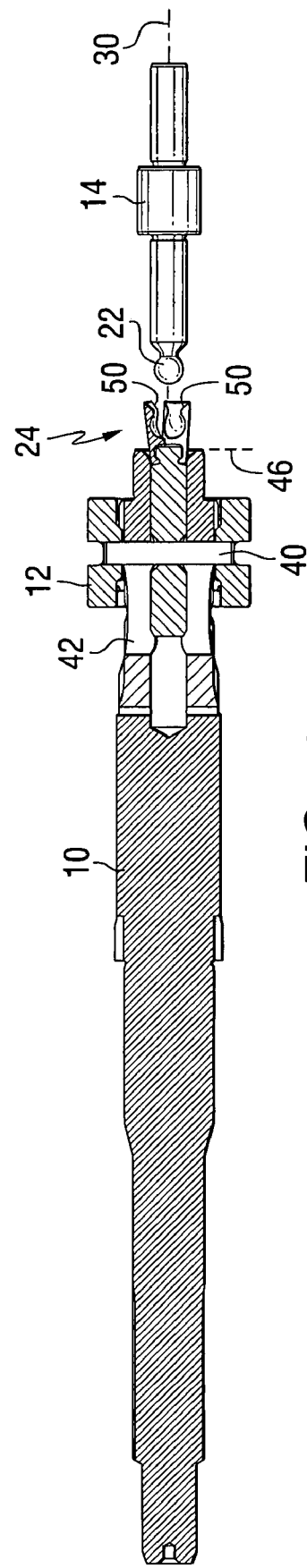

ACTUATOR DEVICE FOR A MARINE PROPULSION TRANSMISSION

BACKGROUND OF THE INVENTION

1. Field of the Invention

The present invention relates generally to a marine propulsion transmission and, more particularly, to an actuator system that simplifies the assembly of gear case components of the transmission in which an actuator is used to move a clutch between forward, neutral, and reverse gear positions.

2. Description of the Related Art

Those skilled in the art of marine propulsion systems are familiar with many different types of transmission devices that are used for the purpose of shifting the gears of the marine propulsion device into forward, neutral, and reverse positions.

U.S. Pat. No. 3,858,101, which issued to Schmiedel et al. on Dec. 31, 1974, discloses a shift motor actuator circuit. It includes a motor driven hydraulic shift mechanism. A DC motor includes the conventional separate reverse winding and forward winding. The armature is connected to drive a valve for actuating a hydraulic shift unit.

U.S. Pat. No. 4,668,198, which issued to Nakamura on May 26, 1987, describes a power switching apparatus for outboard engines. A shifter dog is moved by a shift cam to engage with a forward gear or a reverse gear for rotating a propeller of a boat in the forward or reverse direction. A clutch mechanism is interposed between the shift rod connected to the shift cam and a clutch rod. The clutch mechanism comprises a clutch housing, the diameter of the intermediate portion of an inner opening of the housing being reduced. The housing is formed with large diameter openings at its upper and lower portions.

U.S. Pat. No. 4,698,035, which issued to Ferguson on Oct. 6, 1987, describes a marine propulsion device hydraulic system. The device comprises a shiftable transmission drivingly connecting an engine to a propeller and including a shift lever, a hydraulic shift system connected to the shift lever for actuation thereof, a hydraulic throttle assist system connected to the throttle lever for actuation thereof, and a hydraulic fluid reservoir. A pump communicates with the reservoir and a supply conduit communicates between the pump and the shift assist system. A supply conduit communicates between the shift assist system and the throttle assist system and a return conduit communicates between the throttle assist system and the reservoir.

U.S. Pat. No. 4,986,774, which issued to Wantz on Jan. 22, 1991, discloses a desmodromic shift adaptor for a counter-rotating propeller shaft assembly. The adapter member for accommodating use of a desmodromic cam actuated shifting mechanism is described. Forward thrust on the propeller shaft is transferred to the gear case at a point aft of the forward and reverse gears mounted about the propeller shaft. The adapter member includes a cup, which is adapted to mount fore one of the forward and reverse gears through a bearing member. The adapter member further includes an internal passage within which is disposed the movable cam of the shifting mechanism. An opening is in communication with the passage for allowing connection of the shift shaft to the shifting cam after assembly of the adapter member into the gear case cavity.

U.S. Pat. No. 5,470,264, which issued to Eick on Nov. 28, 1995, discloses a marine drive shift shaft mounting system. A device is provided for isolating a shift shaft extending through an exhaust passage of a bell housing in a marine drive system. The device includes an elongated sleeve for receiving the shift shaft. The sleeve has a first portion sealably mounted in a first bore extending through the top wall of the exhaust passage and a second portion sealably mounted in a second bore which extends through the bottom wall of the exhaust passage.

U.S. Pat. No. 6,176,750, which issued to Alexander et al. on Jan. 23, 2001, discloses a marine propulsion unit with a hydraulic pump. A vertical driveshaft is operably connected to the engine of the propulsion unit and carries a pinion that drives a pair of coaxial bevel gears. A hydraulically operated multi-disc clutch is actuated when engine speed reaches a preselected elevated value to operably connect the second of two bevel gears to the outer propeller shaft to thereby drive the second propeller in the opposite direction of a first propeller.

U.S. Pat. No. 6,692,320, which issued to Sawyer on Feb. 17, 2004, discloses a gear selector actuation system for a marine propulsion device. The system incorporates an adjustable motion directing component that changes the path of travel of an actuator end of a push-pull cable. This adjustable change creates a beneficial effect by changing the relative positions of a shift shaft and associated link arms in relation to positions of a wire within a sheath of a push-pull cable.

U.S. Pat. No. 6,755,703, which issued to Erickson on Jun. 29, 2004, discloses a hydraulically assisted gear shift mechanism for a marine propulsion device. The mechanism is intended for use in conjunction with a gear shift device and provides a hydraulic cylinder and a piston combination connected by a linkage to a gear shift mechanism. Hydraulic pressure can be provided by a pump used in association with either a power trim system or a power steering system. Hydraulic valves are used to pressurize selected regions of the hydraulic cylinder in order to actuate a piston which is connected, by an actuator, to the gear shift mechanism.

The patents described above are hereby expressly incorporated by reference in the description of the present invention.

SUMMARY OF THE INVENTION

A marine propulsion device, made in accordance with a preferred embodiment of the present invention, comprises a gear housing and a propeller shaft supported within the gear housing for rotation about an axis of rotation. A clutch member which is axially movable relative to the propeller shaft in a direction parallel to the axis of rotation is provided and is keyed to the propeller shaft for synchronous rotation with the propeller shaft about the axis of rotation. An actuator is supported within the gear housing for motion parallel to the axis of rotation and a coupler is connected between the clutch and the actuator. The coupler comprises a generally spherical member and a chuck device which is shaped to receive and retain the generally spherical member within its structure. The generally spherical member and the chuck device are rotatable relative to each other. The generally spherical member and the chuck device are axially movable in synchrony with each other in a direction parallel to the axis of rotation.

In a preferred embodiment of the present invention, the generally spherical member is attached to the actuator and the chuck device is attached to the clutch member. The chuck device comprises a plurality of fingers which are movable away from each other to allow the generally spherical member to pass into the chuck device. The plurality of fingers is movable toward each other to retain the generally spherical member within the chuck device. All of the fingers are movable away from each other when the clutch member is moved relative to the propeller shaft in a direction toward the actuator.

In a preferred embodiment of the present invention, all of the fingers are movable away from each other when the clutch member is moved relative to the propeller shaft in a direction toward the actuator and the generally spherical member and the chuck device are moved into contact with each other. Each of the fingers comprises a surface configured to cause an associated one of the fingers to move away from the other fingers in response to contact with the generally spherical member moving toward the chuck device. The clutch member can be a dog clutch that is selectively movable into engagement with forward and reverse gears. In a particularly preferred embodiment of the present invention, the chuck device comprises three fingers.

BRIEF DESCRIPTION OF THE DRAWINGS

The present invention will be more fully and completely understood from a reading of the description of the preferred embodiment in conjunction with the drawings, in which:

FIGS. 1 and 2 are isometric representations of a propeller shaft, clutch, actuator, and coupler of the present invention;

FIGS. 3 and 4 are sectional views of the representations shown in FIGS. 1 and 2;

DESCRIPTION OF THE PREFERRED EMBODIMENT

Figure 5:
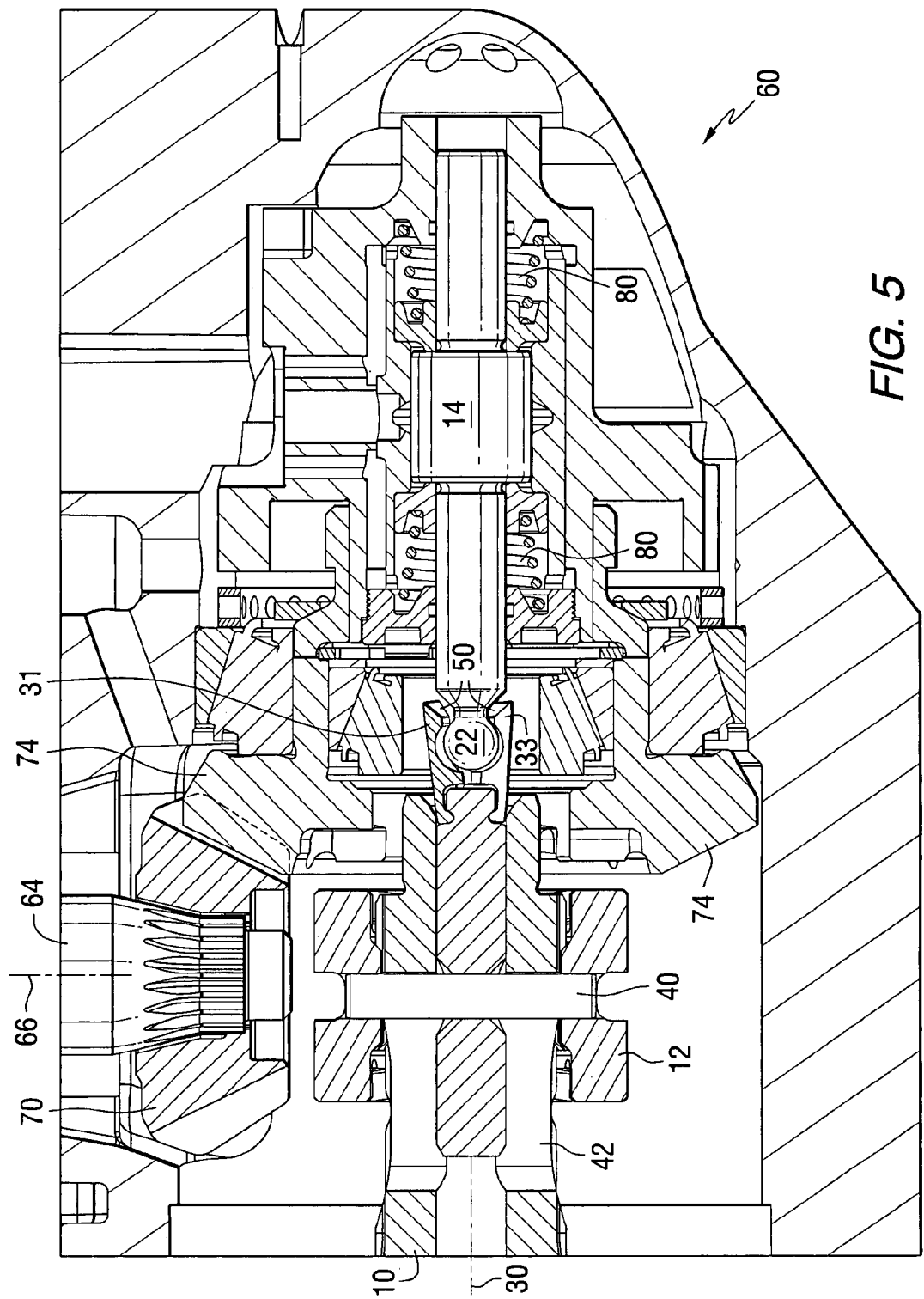
FIG. 5 is a section view of a marine propulsion device made in accordance with a preferred embodiment of the present invention.

Throughout the description of the preferred embodiment of the present invention, like components will be identified by like reference numerals.

FIGS. 1 and 2 show a propeller shaft 10, a clutch member 12 and an actuator 14. A coupler 20 is connected between the clutch member 12 and the actuator 14. The coupler 20 comprises a retainable member 22 and a chuck device 24 which is shaped to receive and retain the retainable member 22 within its structure. The retainable member 22 and the chuck device 24 are rotatable relative to each other about an axis of rotation 30. The retainable member 22 and the chuck device 24 are axially movable in synchrony with each other, when assembled together as shown in FIG. 1, in a direction parallel to the axis of rotation 30. In a particularly preferred embodiment of the present invention, the retainable member 22 is a generally spherical member and the chuck device 24 comprises a plurality of fingers, 31-33.

With continued reference to FIGS. 1 and 2, in a preferred embodiment of the present invention, the retainable member 22 is attached to the actuator 14 and the chuck device 24 is attached to the clutch member 12.

FIGS. 3 and 4 are section views of the devices illustrated in FIGS. 1 and 2, respectively. In FIGS. 3 and 4, it can be seen that the clutch member 12 comprises a pin 40 that extends through an opening 42 formed in the propeller shaft 10. The pin 40, disposed in the opening 42, allows axial movement of the clutch member 12 relative to the propeller shaft 10, but connects the two components together for rotation in synchrony about the axis of rotation 30 described above in conjunction with FIGS. 1 and 2.

With continued reference to FIGS. 1-4, it can be seen that when the clutch member 12 is moved toward the right relative to the propeller shaft 10, the chuck device 24 is extended toward the right partially beyond the end of the propeller shaft that is represented by dashed line 46. When the chuck device 24 is moved toward the right past the end 46 of the propeller shaft 10, as shown in FIGS. 2 and 4, the individual fingers are allowed to move away from each other. This provides sufficient space for the retainable member 22, or generally spherical member, to be accepted within the internal region of the chuck device 24. To facilitate this operation, each of the fingers, 31-33, are provided with a surface 50 that is configured to cause the associated finger to move away from the other fingers in response to contact with the retainable member 22 as it moves toward the chuck device 24. In other words, with particular reference to FIG. 4, movement of the generally spherical member 22 toward the left will cause its spherical surface to move into contact with the surfaces 50 of the fingers and cause them to move away from each other. This is possible because the fingers are extended toward the right past the end 46 of the propeller shaft 10. When the chuck device 24 is moved toward the left, past the end 46 of the propeller shaft 10, it is retained in a closed position by the internal cylindrical surface of the propeller shaft and firmly retains the generally spherical member 22 within its structure.

FIGS. 1-4 illustrate the propeller shaft 10 and actuator 14 without surrounding components. However, it should be understood that other components are used in conjunction with the propeller shaft 10 within the gear case of a marine propulsion device. The operation of the chuck device 24 and the retainable member 22, combined to form a coupler, is provided to facilitate the assembly of these components within a gear case of a marine propulsion device when they are surrounded by other devices that could make this assembly more difficult.

FIG. 5 is a section view of a gear housing 60, or gear case, of a marine propulsion device. The propeller shaft 10 is supported for rotation about the axis of rotation 30 as described above. A driveshaft 64 is supported by the gear housing 60 for rotation about a generally vertical axis 66. A drive gear 70 is attached to the driveshaft 64. A forward gear 74 is supported by the gear housing for rotation about the axis of rotation 30. A reverse gear 76 (not illustrated in FIG. 5) is similarly supported by the gear housing for rotation about the axis of rotation. With the clutch 12 moved toward the end 46 of the propeller shaft 10, as illustrated in FIG. 4, the fingers of the chuck device are allowed to spread apart in response to the retainable member 22 moving into contact with the surfaces 50. Since the actuator 14 is generally stationary when the propeller shaft 10 and clutch member 12 is being assembled as illustrated in FIG. 5, the surfaces 50 are actually moved toward the right and into contact with a relatively stationary retainable member 22. With the clutch member 12 moved toward the right relative to the propeller shaft 10, the fingers are movable into the positions shown in FIG. 5 until the clutch member 12 is moved toward the left relative to the propeller shaft 10. When this is done, the fingers close toward each other and retain the generally spherical member 22 within the structure of the chuck device. The position of the clutch member 12, relative to the propeller shaft 10 shown in FIGS. 2, 4, and 5 is beyond its normal range of movement after the assembly is complete and the system is in normal operating condition.

With continued reference to FIG. 5, the actuator 14 is a hydraulic actuator in which its piston structure is moved toward the left or toward the right against the resistance of one of the two springs 80. As it moves axially, parallel to the axis of rotation 30, in response to changes in hydraulic pressure, the retainable member 22 moves in synchrony with the actuator 14. Since the retainable member 22 is retained within the chuck device, and the chuck device is retained within the cylindrical opening of the propeller shaft 10, the clutch member 12 is moved toward the left or right in response to movement of the actuator 14. This moves the clutch teeth, or dog teeth, into engagement with either the forward gear 74 or the reverse gear 76. This engagement, in turn, locks the propeller shaft 10 into rotation with the gear with which the clutch member 12 is engaged. This type of transmission is well known to those skilled in the art of marine propulsion devices and will not be described in greater detail herein.

Figure 6:
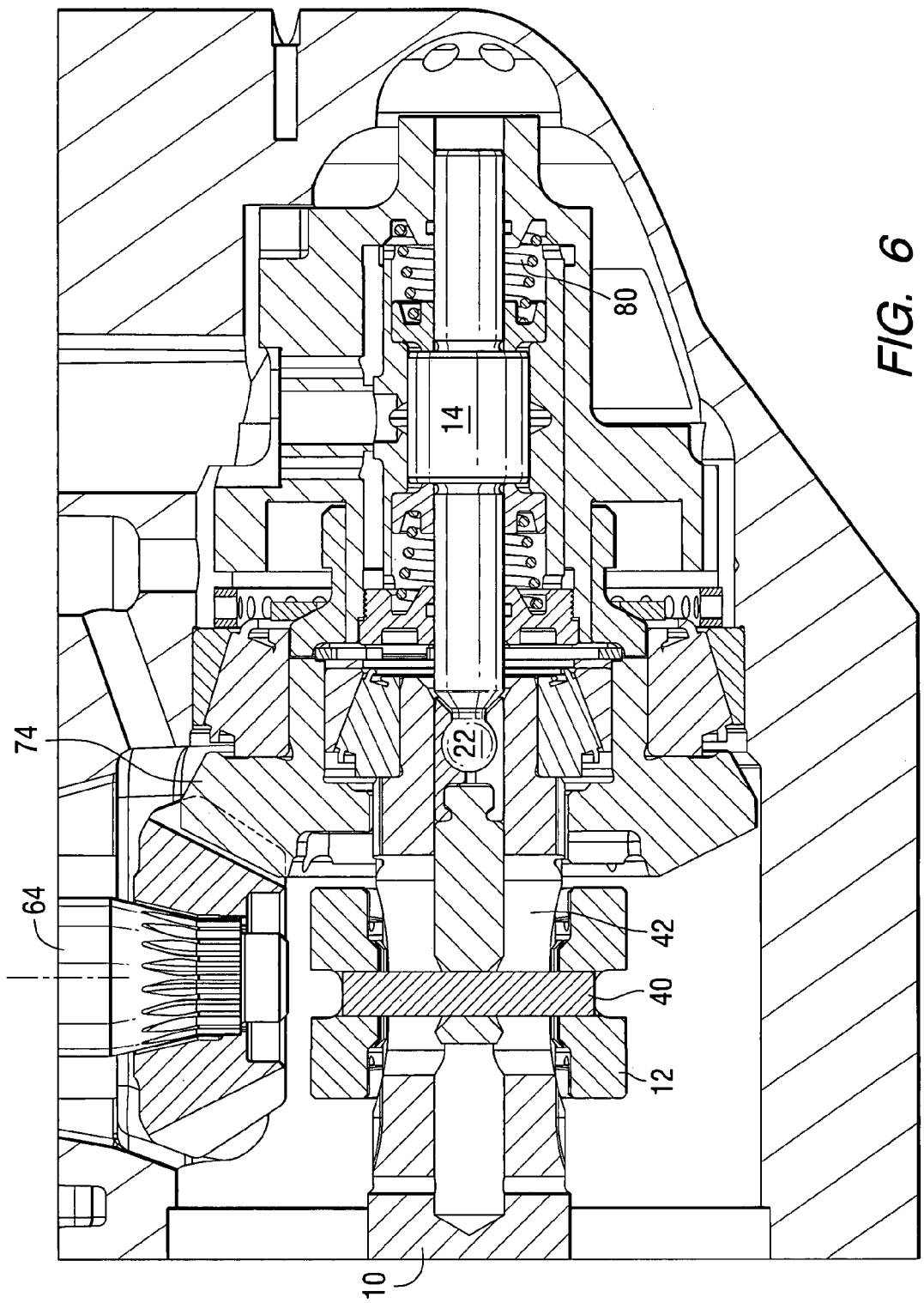
FIG. 6 is generally similar to FIG. 5, but after the components are assembled together.

FIG. 6 is generally similar to FIG. 5, but with the clutch member 12 moved toward the left relative to the propeller shaft 10 so that the chuck device is firmly enclosed around the retainable member 22 and held in that position by the location of the chuck device within the cylindrical opening of the propeller shaft 10. This locks the clutch member 12 into axial movement in synchrony with the actuator 14 while allowing the actuator 14 to remain generally stationary about the axis of rotation 30 while the clutch member 14 and the propeller shaft 10 rotate about the axis of rotation 30 in response to the connection between the clutch member 12 with either the forward or reverse gears, 74 or 76.

Figure 7:
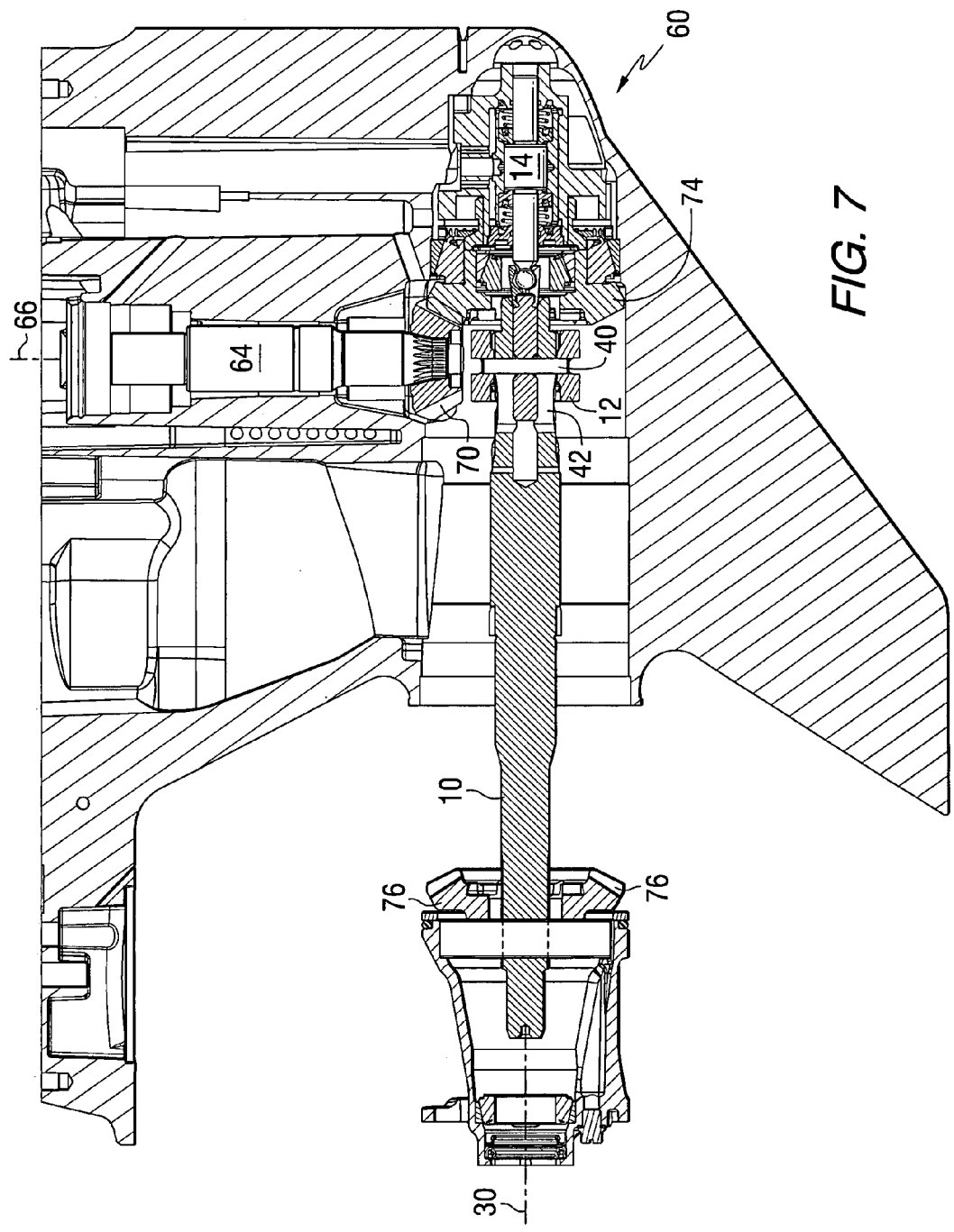
FIG. 7 shows the marine propulsion device of FIGS. 5 and 6, but with a reverse gear assembly being moved into position within a gear housing.

FIG. 7 is a section view of the gear housing 60 and internal components along with the reverse gear 76 and its associated structure. The purpose of FIG. 7 is to show the subsequent assembly of the reverse gear 76 into the cavity of the gear housing 60 for rotation about the axis of rotation 30. As can be seen, the clutch member 12 is moved toward the right relative to the propeller shaft 10 to accept the retainable member within the structure of the chuck device. After the clutch member 12 is moved back toward its normal position and the clutch device is contained within the cylindrical opening of the propeller shaft 10, as illustrated in FIG. 6, the reverse gear 76 and its associated structure is moved toward the right from its position shown in FIG. 7. The forward and reverse gears, 74 and 76, are in meshing relation with the drive gear 70 so that they continuously rotate in synchrony with the driveshaft 64, but in opposite directions, around the axis of rotation 30. When the clutch member 12 is moved toward the right in FIG. 7, it locks the forward gear 74 to the propeller shaft 10. When it moves toward the left it locks the reverse gear 76 to the propeller shaft 10. When in the position between the forward and reverse gears, the clutch member 12 is in a neutral position.

With reference to FIGS. 1-7, a preferred embodiment of the present invention comprises a gear housing 60, a driveshaft 64 supported by the gear housing for rotation about a generally vertical axis 66, a drive gear 70 attached to the driveshaft 64, a propeller shaft 10 supported within the gear housing 60 for rotation about a generally horizontal axis of rotation 30, a forward gear 74 and a reverse gear 76, both supported by the gear housing 60, a clutch member 12 that is axially movable relative to the propeller shaft 10 in a direction parallel to the axis of rotation 30, the clutch member being keyed to the propeller shaft 10 for synchronous rotation with the propeller shaft about the axis of rotation 30 and alternatively movable into engagement with the forward and reverse gears, 74 and 76, an actuator 14 supported within the gear housing 60 for motion parallel to the axis of rotation 30 and a coupler connected between the clutch member 12 and the actuator 14. The coupler comprises a retainable member 22 and a chuck device 24 which is shaped to receive and retain the retainable member within its structure. The retainable member and the chuck device are rotatable relative to each other and axially movable in synchrony with each other in a direction parallel to the axis of rotation 30. In a preferred embodiment of the present invention, the retainable member 22 is a generally spherical member and is attached to the actuator 14. The chuck device 24 is attached to the clutch member and comprises a plurality of fingers. The fingers, 31-33, are movable away from each other to allow the retainable member 22 to pass into the chuck device and are movable toward each other to retain the retainable member within the chuck device. The plurality of fingers is movable away from each other when the clutch member 12 is moved relative to the propeller shaft 10 in a direction toward the actuator 14. The fingers move away from each other when the clutch member is moved relative to the propeller shaft 10 in a direction toward the actuator 14 and the retainable member 22 and a chuck device are moved into contact with each other. Each of the fingers, in a particularly preferred embodiment of the present invention, comprises a surface 50 that is configured to cause the finger to move away from the other fingers in response to contact with the retainable member 22 moving toward the chuck device 24. In a preferred embodiment of the present invention, the clutch member 12 is a dog clutch, the retainable member 22 is a generally spherical member and the generally spherical member is formed as an integral portion of the actuator 14. However, it should be understood that alternative configurations of the individual elements of the present invention can be changed in alternative embodiments.

Although the present invention has been described in particular detail and illustrated to show a preferred embodiment, it should be understood that alternative embodiments are also within its scope.

We claim:

1. A marine propulsion device, comprising:
   a gear housing;
   a propeller shaft supported within said gear housing for rotation about an axis of rotation;
   a clutch member which is axially movable relative to said propeller shaft in a direction parallel to said axis of rotation, said clutch member being keyed to said propeller shaft for synchronous rotation with said propeller shaft about said axis of rotation;
   an actuator supported within said gear housing for motion parallel to said axis of rotation; and
   a coupler connected between said clutch member and said actuator, said coupler comprising a generally spherical member and a chuck device which is shaped to receive and retain said generally spherical member within its structure, said generally spherical member and said chuck device being rotatable relative to each other, said generally spherical member and said chuck device being axially movable in synchrony with each other in a direction parallel to said axis of rotation, said chuck device comprising a plurality of fingers which are movable away from each other to allow said generally spherical member to pass into said chuck device and are movable toward each other to retain said generally spherical member within said chuck device.

2. The device of claim 1, wherein:
   said generally spherical member is attached to said actuator.

3. The device of claim 1, wherein:

said chuck device is attached to said clutch member.

4. The device of claim 1, wherein:

all of said plurality of fingers is are movable away from each other when said clutch member is moved relative to said propeller shaft in a direction toward said actuator.

5. The device of claim 1, wherein:

all of said plurality of fingers are movable away from each other when said clutch member is moved relative to said propeller shaft in a direction toward said actuator and said generally spherical member and said chuck device are moved into contact with each other.

6. The device of claim 1, wherein:

each of said plurality of fingers comprises a surface configured to cause an associated one of said plurality of fingers to move away from the other ones of said plurality of fingers in response to contact with said generally spherical member moving toward said chuck device.

7. The device of claim 1, wherein:

said clutch member is a dog clutch that is selectively movable into engagement with forward and reverse gears.

8. The device of claim 1, wherein:

said plurality of fingers comprises three fingers.

9. A marine propulsion device, comprising:

a gear housing;

a drive shaft supported by said gear housing for rotation about a generally vertical axis;

a drive gear attached to said drive shaft;

a propeller shaft supported within said gear housing for rotation about a generally horizontal axis of rotation;

a forward gear supported by said gear housing for rotation about said axis of rotation;

a reverse gear supported by said gear housing for rotation about said axis of rotation;

a clutch member which is axially movable relative to said propeller shaft in a direction parallel to said axis of rotation, said clutch member being keyed to said propeller shaft for synchronous rotation with said propeller shaft about said axis of rotation, said clutch member being alternatively movable into engagement with said forward and reverse gears;

an actuator supported within said gear housing for motion parallel to said axis of rotation; and a coupler connected between said clutch member and said actuator, said coupler comprising a retainable member and a chuck device which is shaped to receive and retain said retainable member within its structure, said retainable member and said chuck device being rotatable relative to each other, said retainable member and said chuck device being axially movable in synchrony with each other in a direction parallel to said axis of rotation, said chuck device comprising a plurality of fingers which are movable away from each other to allow said retainable member to pass into said chuck device and are movable toward each other to retain said retainable member within said chuck device, said plurality of fingers being movable away from each other when said clutch member is moved relative to said propeller shaft in a direction toward said actuator.

10. The device of claim 9, wherein:

said retainable member is attached to said actuator; and
said chuck device is attached to said clutch member.

11. The device of claim 9, wherein:

all of said plurality of fingers are movable away from each other when said clutch member is moved relative to said propeller shaft in a direction toward said actuator and said retainable member and said chuck device are moved into contact with each other.

12. The device of claim 11, wherein:

each of said plurality of fingers comprises a surface configured to cause an associated one of said plurality of fingers to move away from the other ones of said plurality of fingers in response to contact with said retainable member moving toward said chuck device.

13. The device of claim 9, wherein:

said clutch member is a dog clutch.

14. The device of claim 9, wherein:

said retainable member is a generally spherical member.

15. The device of claim 14, wherein:

said generally spherical member is formed as an integral portion of said actuator.

16. A marine propulsion device, comprising:

a gear housing;

a drive shaft supported by said gear housing for rotation about a generally vertical axis;

a drive gear attached to said drive shaft;

a propeller shaft supported within said gear housing for rotation about a generally horizontal axis of rotation;

a forward gear supported by said gear housing for rotation about said axis of rotation;

a reverse gear supported by said gear housing for rotation about said axis of rotation;

a clutch member which is axially movable relative to said propeller shaft in a direction parallel to said axis of rotation, said clutch member being keyed to said propeller shaft for synchronous rotation with said propeller shaft about said axis of rotation, said clutch member being alternatively movable into engagement with said forward and reverse gears;

an actuator supported within said gear housing for motion parallel to said axis of rotation; and a coupler connected between said clutch member and said actuator, said coupler comprising a retainable member attached to said actuator and a chuck device attached to said clutch member and shaped to receive and retain said retainable member within its structure, said retainable member and said chuck device being rotatable relative to each other, said retainable member and said chuck device being axially movable in synchrony with each other in a direction parallel to said axis of rotation, said chuck device comprising a plurality of fingers which are movable away from each other to allow said retainable member to pass into said chuck device and are movable toward each other to retain said retainable member within said chuck device, said plurality of fingers being movable away from each other when said clutch member is moved relative to said propeller shaft in a direction toward said actuator, said plurality of fingers being movable away from each other when said clutch member is moved relative to said propeller shaft in a direction toward said actuator and said retainable member and said chuck device are moved into contact with each other.

17. The device of claim 16, wherein:

each of said plurality of fingers comprises a surface configured to cause an associated one of said plurality of fingers to move away from the other ones of said plurality of fingers in response to contact with said retainable member moving toward said chuck device.

18. The device of claim 17, wherein:

said retainable member is a generally spherical member which is formed as an integral portion of said actuator.

* * * * *